United States Patent

Hansen et al.

Patent Number: 5,889,647
Date of Patent: Mar. 30, 1999

[54] MULTILAYER CAPACITOR COMPRISING TUNGSTEN-CONTAINING BATIO₃

[75] Inventors: Peter Hansen; Detlev Hennings; Baby S. Schreinemacher, all of Aachen, Germany

[73] Assignee: U.S. Philips Corporation, New York, N.Y.

[21] Appl. No.: 918,847

[22] Filed: Aug. 26, 1997

[30] Foreign Application Priority Data

Aug. 31, 1996 [DE] Germany .................. 19635406.4

[51] Int. Cl.⁶ ................................. H01G 4/06
[52] U.S. Cl. .............. 361/311; 361/321.5; 501/136; 501/137
[58] Field of Search ...................... 501/134–139; 361/311–313, 321.1–321.5

[56] References Cited

U.S. PATENT DOCUMENTS 5,319,517 6/1994 Nomura et al. .

Primary Examiner—Kristine Kincaid
Assistant Examiner—Anthony Dinkins
Attorney, Agent, or Firm—Norman N. Spain

[57] ABSTRACT

A capacitor comprising a ceramic dielectric material and at least two electrodes, said dielectric material essentially consisting of a dielectric composition with a doped barium-calcium-zirconium-titanate, said doped barium-calcium-zirconium-titanate having the composition $$Ba_{0.96}Ca_{0.04})_a[Ti_{0.82-y}Zr_{0.18}Mn_y]O_3,$$

wherein $0.001 \leq y \leq 0.01$, $1.00 < a \leq 1.02$ and being doped with tungsten in a quantity r of 0.001 to 0.005 mol/formula unit and with at least one element A of the group formed by aluminium, gallium, yttrium, zinc, nickel and ytterbium in a quantity s of 0.001 to 0.005 mol/formula unit.

6 Claims, 1 Drawing Sheet

MULTILAYER CAPACITOR COMPRISING TUNGSTEN-CONTAINING BATIO₃

BACKGROUND OF THE INVENTION

The invention relates to a capacitor, in particular a multilayer capacitor with internal electrodes of base metals, said capacitor comprising a ceramic dielectric material and at least two electrodes, said dielectric material essentially consisting of a dielectric composition with a doped barium-calcium-zirconium-titanate.

Ceramic multilayer capacitors are customarily manufactured by alternately stacking layers for the dielectric material, which are made of a green, dielectric ceramic composition, and layers for the electrodes, which are made of a metal paste, whereafter the stacks of ceramic and metal layers are co-sintered.

The quality of multilayer capacitors is governed by the chemical composition of the material used for the dielectric and the electrodes, as well as by the manufacturing conditions. As regards the manufacturing conditions, in particular, the sintering conditions play a role. Depending on the sinter atmosphere, opposed oxidation and reduction reactions may take place. During sintering in a reducing atmosphere, barium titanate and the derivatives thereof, such as the doped barium-calcium-zirconium-titanates, become semi-conducting; in this condition, they are unsuitable as a dielectric material. Multilayer capacitors can only be sintered under oxidizing conditions if the electrode material is composed of rhodium, palladium or platinum. However, rhodium and platinum are very expensive, up to 50% of the manufacturing costs can be attributed to the use of these materials. Therefore, there is a tendency to use the much cheaper nickel or the alloys thereof instead of rhodium and platinum. However, nickel oxidizes if it is sintered under oxidizing conditions, so that multilayer capacitors having nickel electrodes must be sintered in an inert or slightly reducing atmosphere. Sintering in a reducing atmosphere would cause the tetravalent titanium in the barium titanate to be reduced to trivalent titanium, which would lead to an extreme reduction of the insulation resistance of the capacitors. Meanwhile, however, it has been achieved to lessen the reducibility of the barium titanate by doping it with additives, which are acceptors such as $Cr_2O_3$, $Co_2O_3$ or MnO.

However, these dopants cannot prevent the formation of oxygen vacancies in the crystal during sintering in a reducing atmosphere, which oxygen vacancies drastically reduce the service life of the capacitors. Said oxygen vacancies have a high mobility in the crystal lattice and migrate under the influence of an electric voltage and temperature. As a result, the insulation resistance decreases with time.

The formation of oxygen vacancies can be partly undone by subjecting the capacitors, after they have been sintered in a reducing atmosphere, to a tempering process in a slightly oxidizing atmosphere at temperatures between 600° C. and 1100° C. In this process, the oxygen vacancies in the lattice are filled again. A disadvantage of said tempering process is the substantial decrease of said dielectric constant $\in$ and the negative influence on the $\Delta C/\Delta t$-curve, i.e. on the temperature-dependence of the dielectric constant.

In order to overcome said complex difficulties which are encountered in the manufacture of ceramic capacitors with base-metal electrodes, it is proposed, in U.S. Pat. No. 5,319,517, to use a multilayer ceramic chip capacitor comprising internal electrodes and dielectric layers, the dielectric material of which contains a dielectric oxide having a composition of the following formula:

$$[(Ba_{1-x-y}Ca_xSr_y)O]_m(Ti_{1-z}Zr_z)O_2,$$

wherein $0 \leq x \leq 0.25$, $0 \leq y \leq 0.05$, $0.1 \leq z \leq 0.3$, and $1.000 \leq m \leq 1.020$ and having added thereto a manganese oxide and/or a compound which converts to the oxide upon firing in an amount of 0.01 to 0.5% by weight calculated as oxide (MnO), an yttrium oxide and/or a compound which converts to the oxide upon firing in a quantity of 0.05 to 0.5% by weight calculated as oxide ($Y_2O_3$), a vanadium oxide and/or a compound which converts to the oxide upon firing in an amount of 0.005 to 0.3% by weight calculated as oxide ($V_2O_5$), a tungsten oxide and/or a compound which converts to the oxide upon firing in a quantity of 0.005 to 0.3% by weight calculated as oxide ($WO_3$), and nickel or a nickel alloy being used as the material for the inner electrodes of said multilayer capacitor. The ever increasing requirements in terms of service life and reliability can hitherto not be met by these multilayer capacitors.

SUMMARY OF THE INVENTION

Therefore, it is an object of the invention to provide a ceramic capacitor, in particular a multilayer capacitor with electrodes of base metals, which comprises a ceramic dielectric material and at least two electrodes, said dielectric material essentially being composed of a dielectric ceramic composition with a doped barium-calcium-zirconium-titanate, said capacitor being characterized by a longer service life, a greater reliability, a high dielectric constant and a small temperature-dependence of the dielectric constants over a wide temperature range.

In accordance with the invention, this object is achieved by a capacitor comprising a ceramic dielectric material and at least two electrodes, said dielectric material essentially being composed of a dielectric ceramic composition with a doped barium-calcium-zirconium-titanate, characterized in that said doped barium-calcium-zirconium-titanate has the composition $$(Ba_{0.96}Ca_{0.04})_a[Ti_{0.82-y}Zr_{0.18}Mn_y]O_3,$$

wherein $0.001 \leq y \leq 0.01$, $1.00 \leq a \leq 1.02$ and being doped with tungsten in a quantity r of 0.001 to 0.005 mol/formula unit and with at least one element A of the group formed by aluminium, gallium, yttrium, zinc, nickel and ytterbium in a quantity s of 0.001 to 0.005 mol/formula unit. Said capacitor is characterized by a high dielectric constant $\in$ and, at the same time, a high stability of the capacitance value, a low loss factor, a high insulation resistance and a slightly voltage-independent capacitance. The temperature-dependence of the dielectric constant $\in$ meets the EIA-standard Y5V. The field of application includes, in particular, coupling and decoupling as well as the elimination of radio interference in extra-low voltage applications.

Within the scope of the invention, it is preferred that nickel or a nickel alloy is used as the material for the electrodes.

It is particularly preferred that the capacitor is a multilayer capacitor comprising internal electrodes of nickel or a nickel alloy.

It is further preferred that $y \leq 0.005$ and the atomic ratio n of $(y+s/r)$ is greater than 1. By virtue of this atomic ratio between manganese, yttrium and tungsten, with a balanced ratio between donors and acceptors, a low ion mobility and hence a very long service life at high temperatures and electric fields is achieved. At the same time, the acceptor concentration is high enough to provide for controllable redox reactions during the sintering of the multilayer capacitor comprising base-metal electrodes, and to attain a satisfactory grain growth.

It is particularly preferred that $y \leq 0.005$, $1 < a = 1.01$, $r = 0.0025$ mol/formula unit and $s < 0.010$ mol/formula unit. This composition of the barium-calcium-zirconium-titanate enables an optimum grain growth and a high dielectric maximum at room temperature to be attained.

It may also be preferred that the dielectric ceramic composition comprises 0.1–1% by weight of a sintering aid composed of 0.16 to 0.29 mol of lithium oxide, 0.004 to 0.39 mol of one of the oxides CaO, MgO, BaO or SrO as well as silicon oxide. The addition of this mixture enables the sintering temperature to be reduced to 1150° C.

These and other aspects of the invention will be apparent from and elucidated with reference to the embodiments described hereinafter.

DETAILED DESCRIPTION OF THE INVENTION

Figure 1:
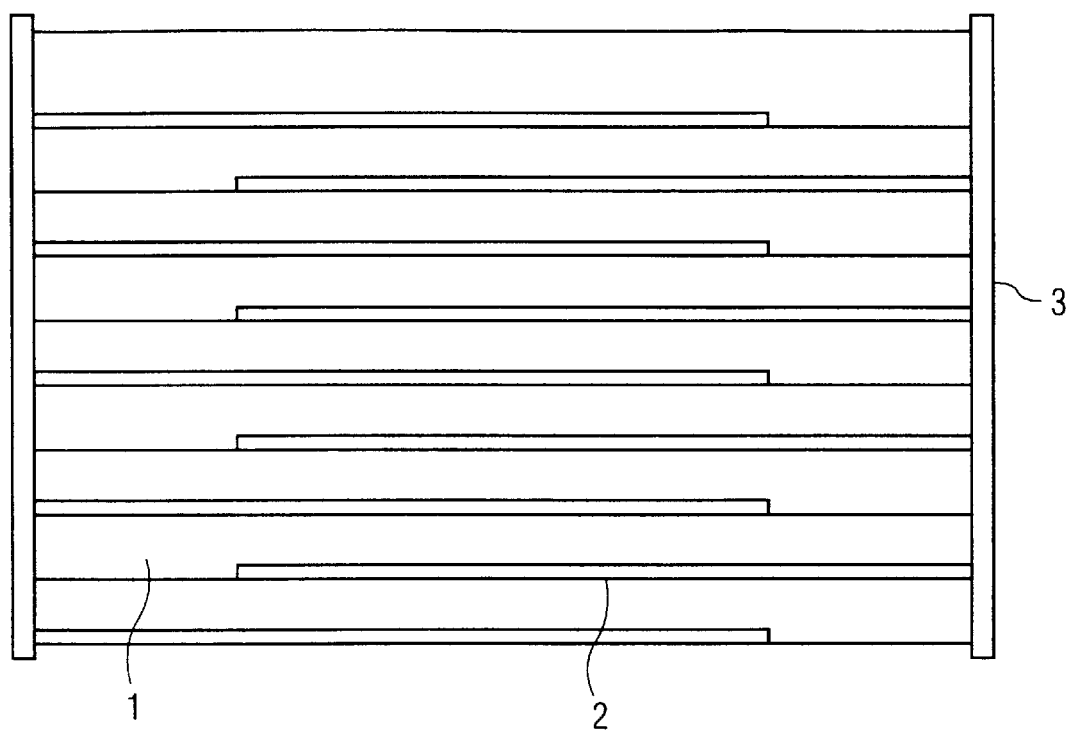
FIG. 1 is a cross-sectional view of a preferred embodiment of the capacitor in accordance with the invention. In this preferred embodiment, the capacitor in accordance with the invention is a multilayer capacitor.

The invention will now be described in greater detail with reference to the sole figure of the drawing and the examples.

In the embodiment shown in FIG. 1 the ceramic multilayer capacitor in accordance with the invention comprises a ceramic dielectric material 1, which is composed of a plurality of oxidic dielectric layers having a thickness of maximally 50 $\mu$, as well as a plurality of internal electrodes 2, which are layered in the dielectric material and extend alternately to two opposing end faces of the dielectric material. The end faces of the ceramic dielectric material are provided with metallic contact electrodes 3 which serve as external terminals which are connected to the corresponding metallic internal electrodes.

The inventive multilayer capacitor is manufactured by means of production techniques which are customarily used for the manufacture of ceramic capacitors, and, depending on the desired shape and dimensions, the required accuracy and the field of application, said capacitor can be manufactured in many different versions.

The material used for the ceramic dielectric is a dielectric ceramic composition comprising a doped barium-calcium-zirconium-titanate having the composition $(Ba_{0.96}Ca_{0.04})_a$ $[Ti_{0.82-y}Zr_{0.18}Mn_y]O_3$, wherein $0.001 \leq y \leq 0.001$, $1.000 < a \leq 1.02$ and having added thereto tungsten in a quantity r of 0.001 to 0.005 mol/formula unit and yttrium in a quantity s of 0.001 to 0.005 mol/formula unit.

The dielectric ceramic composition preferably comprises $SiO_2$ as the sintering aid. To obtain an inventive barium-calcium-zirconium-titanate in which $a = 1.005$, a quantity of 0.125% by weight of $SiO_2$ is added to the composition, for $a = 1.01$, a quantity of 0.25% by weight of $SiO_2$ is added to the composition. Instead of said standard sintering aid, a quantity of 0.1–1% by weight of a sintering aid comprising 0.16 to 0.29 mol of lithium oxide, 0.004 to 0.39 mol of one of the oxides CaO, MgO, BaO or SrO as well as silicon oxide can be added to the mixture. This sintering aid enables the sintering temperature to be reduced from 1300° C. to 1150° C.

The choice of material for the electrodes is not subject to particular limitations, so that a metal or a combination of two or more customarily used metals can be selected. The electrodes may be composed of noble metals, such as platinum, palladium, gold or silver. They may also contain chromium, zirconium, vanadium, zinc, copper, tin, lead, manganese, molybdenum, tungsten, titanium or aluminium. The electrodes are preferably composed of a base metal selected from the group formed by nickel, iron, cobalt and the alloys thereof.

The dielectric ceramic composition can be prepared by means of customary powder-manufacturing methods, such as the mixed-oxide method, co-precipitation, spray-drying, sol/gel-method, hydrothermal methods or alkoxide methods. Preferably, use is made of the mixed-oxide method in which the starting oxides or thermally decomposable compounds, such as carbonates, hydroxides, oxalates or acetates are mixed and ground. Subsequently, the starting powder is calcined at a temperature in the range from 1000° C. to 1400° C.

To form the green body use can also be made of any customary method. Multilayer ceramic capacitors are formed by first preparing a suspension from the calcined powder, which suspension also comprises solvents, binders and, if necessary, softeners and dispersing aids. The solvent may be, for example, water, an alcohol, toluene, xylene or trichloroethylene. For the binders use is customarily made of organic polymers, such as polyvinyl alcohol, polyvinyl butyral or polymethyl methacrylate. For the softeners use can be made of glycerine, polyglycols or phtalates. Further, dispersing agents such as alkylaryl polyether alcohols, polyethylene glycol ethylether or oxtylphenoxy ethanol may be added to the suspension.

The preferred method is used to manufacture green ceramic foils from the suspension by means of a foil-casting process. In said foil-casting process, the suspension is poured onto a moving supporting surface. After evaporation of the solvent, a foil remains which, depending on the binder system, is more or less flexible, whereafter said foil is cut and printed with a metal paste in accordance with the pattern of the internal electrodes by means of a screen-printing method, and then laminated. The individual multilayer capacitors are cut from said laminate. Said multilayer capacitors are first sintered in a slightly reducing atmosphere at temperatures ranging between 1100° and 1400° C., whereafter they are tempered in a slightly oxidizing atmosphere at temperatures ranging between 600° and 1100° C. For the slightly reducing atmosphere use can be made of water vapor-saturated nitrogen with an admixture of 0.5 to 2% by volume of hydrogen, for the slightly oxidizing atmosphere use can be made of nitrogen with 5 ppm to 100 ppm of oxygen.

To form the external electrodes, the end faces of the capacitors are provided with a metal paste containing, for example, nickel, followed by a burning-in process. The external electrodes may alternatively be provided by vapor deposition of a metal layer, for example, of gold.

The sintered ceramic dielectric material has a homogeneous microstructure with grain sizes below 5 $\mu m$.

To characterize the capacitors in accordance with the invention, the dielectric constant $\in$ at 25° C. and the loss factor tg$\delta$ were measured in a known manner. The service life $\tau$ is measured in an accelerated life test (ALT) at 350° C. and 900 V. For this purpose, test pellets having a diameter of 5 mm and a layer thickness of 0.05 mm, which were in contact with electrodes, were manufactured, heated to 350° C. and subjected to a voltage of 1800 V/mm. The current is measured and this value is used to calculate the insulation resistance. At the beginning of the test, the insulation resistance is high initially. In the course of the test, the insulation resistance is at an essentially constant high level. The insulation resistance does not decrease until after a specific characteristic degradation time. In comparison with the time measured so far, the leakage current increases by several orders of magnitude in a short period of time. The service life τ is defined as the time which it takes for the leakage current to increase by one order of magnitude.

EXAMPLE 1

To manufacture a multilayer capacitor comprising a ceramic dielectric material having the composition $(Ba_{0.96}Ca_{0.04})_{1.005}[Ti_{0.815}Zr_{0.18}Mn_{0.005}]O_3$ with tungsten and yttrium in a quantity of 0.0025 mol/formula unit each, and 0.125% by weight of $SiO_2$ as the sintering aid, 190.40 g of $BaCO_3$ ($d_{50}$=1.1 μm, BET:2.1 m$^2$/g), 1.03 g of $CaCO_3$ ($d_{50}$=0.8 μm), 65.12 g of $TiO_2$ ($d_{50}$=0.48 μm, BET:7 m$^2$/g), 22.18 g of $ZrO_2$ ($d_{50}$=0.12 μm, BET:21.9 m$^2$/g), 0.57 g of $MnCO_3$, 0.58 g $WO_3$ ($d_{50}$=0.15 μm), 0.56 g $Y_2O_3$ ($d_{50}$=0.34 μm) and 0.36 g of $SiO_2$ (colloidal, 22 nm) are ground in a planetary ball mill for two hours and mixed. For the grinding fluid use is made of cyclohexane, for the grinding balls use is made of agate. Subsequently, the mixture is ground by means of 2 mm-YTZ-balls in isopropanol for 24 hours. After grinding in the planetary ball mill, the mixture is dried in air under a surface evaporator and subsequently calcined for 6 hours at 1250° C. The powdered material is subsequently mixed with polyvinyl alcohol as the binder, with a surface-active agent, a dispersing agent and water to form a slurry. Said slurry is processed in a blade-coating device to form green ceramic foils having a thickness of 20 μm.

The green foil is cut into card-shaped foils, printed with a nickel paste in accordance with the pattern of the internal electrodes, stacked, compressed and subdivided into the individual capacitors. The capacitors are sintered at a temperature of 1300° C. The heating rate is 300° C./h up to 1000° C. and 50° C./h up to 1300° C. In the course of the sintering process, a gas mixture of 99% $N_2$ and 1% $H_2$, which is saturated with water vapor, is passed through the furnace. Subsequently, cooling takes place at a rate of 300° C./h. After the sintering process, the capacitors are tempered in a temperating furnace at a temperature of 1000° C. In the course of the tempering process, a gas mixture consisting of nitrogen with 50–100 ppm oxygen is passed through the furnace.

For the external electrodes use is made of a 6 nm thick CrNi-layer which is provided by vapor deposition and which is coated with 0.15 μm Au.

Test results: Å=19,000; tan δ<5%, τ>280 h.

EXAMPLE 2

To manufacture a multilayer capacitor comprising a ceramic dielectric material of the composition $(Ba_{0.96}Ca_{0.04})_{1.01}[Ti_{0.8175}Zr_{0.18}Mn_{0.0025}]O_3$ with tungsten in a quantity of 0.0025 mol/formula unit, yttrium in a quantity of 0.005 mol/formula unit and 0.25% by weight of $SiO_2$ as a sintering aid, 191.35 g of $BaCO_3$ ($d_{50}$=1.1 μm, BET:2.1 m$^2$/g), 1.04 g of $CaCO_3$ ($d_{50}$=0.8 μm), 65.32 of $TiO_2$ ($d_{50}$=0.48 μm, BET:7 m$^2$/g), 22.18 g of $ZrO_2$ ($d_{50}$=0.12 μm, BET:21.9 m$^2$/g), 0.29 g of $MnCO_3$, 0.58 g of $WO_3$ ($d_{50}$=0.15 μm), 1.12 g of $Y_2O_3$ ($d_{50}$=0.34 μm) and 0.71 g of $SiO_2$ (colloidal, 22 nm) are ground in a planetary ball mill for two hours and mixed. For the grinding liquid use is made of cyclohexane, and for the grinding balls use is made of agate. Subsequently, the mixture is ground by means of 2 mm-YTZ-balls in isopropanol for 24 hours. After grinding in the planetary ball mill, the mixture is dried in air under a surface evaporator and, subsequently, calcined at 1250° C. for 6 hours. The powdered material is mixed with polyvinyl alcohol as the binder, with surface-active agents, a dispersing agent and water to form a suspension. This suspension is processed in a blade-coating device to form green ceramic foils having a thickness of 20 μm.

The green foil is cut into card-shaped foils, printed with a nickel paste in accordance with the pattern of the internal electrodes, stacked, compressed and subdivided into individual capacitors. The capacitors are sintered at a temperature of 1300° C. The heating rate is 300° C./h up to /1000° C. and 50° C./h up to 1300° C. In the course of the sintering process, a gas mixture consisting of 99% of $N_2$ and 1% of $H_2$, saturated with water vapor, is passed through the furnace. Subsequently, cooling takes place at a rate of 300° C./h. After sintering, the capacitors are tempered in a tempering furnace at a temperature of 1000° C. In the course of the tempering process, a gas mixture consisting of nitrogen with 10–50 ppm of oxygen is passed through the furnace.

For the external electrodes use is made of a 6 nm thick CrNi-layer which is provided by vapor deposition and to which a 0.15 μm thick Au coating is applied.

Test results: ∈=21 3000; tan δ<5%, τ>100 h.

EXAMPLE 3

To manufacture a multilayer capacitor comprising a ceramic dielectric material of the composition $(Ba_{0.96}Ca_{0.04})_{1.01}[Ti_{0.815}Zr_{0.18}Mn_{0.005}]O_3$ with yttrium in a quantity of 0.01 mol/formula unit, tungsten in a quantity of 0.025 mol/formula unit and 0.125% by weight of $SiO_2$ as a sintering aid, 191.35 g of $BaCO_3$ ($d_{50}$=1.1 μm, BET:2.1 m$^2$/g), 1.04 g of $CaCO_3$ ($d_{50}$=0.8 μm), 65.12 g of $TiO_2$ ($d_{50}$=0.48 μm, BET:7 m$^2$/g), 22.18 g of $ZrO_2$ ($d_{50}$=0.12 μm, BET:21.9 m$^2$/g), 0.57 g of $MnCO_3$, 0.58 g of $WO_3$ ($d_{50}$=0.15 μm), 2.24 g of $Y_2O_3$ ($d_{50}$=0.34 μm) and 0.36 g of $SiO_2$ (colloidal, 22 nm) are ground in a planetary ball mill for two hours and mixed. For the grinding liquid use is made of cyclohexane, and for the grinding balls use is made of agate. Subsequently, the mixture is ground by means of 2 mm-YTZ-balls in isopropanol for 24 hours. After grinding in the planetary ball mill, the mixture is dried in air under a surface evaporator and, subsequently, calcined at 1250° C. for 6 hours. The powdered material is mixed with polyvinyl alcohol as the binder, with a surface-active agent, a dispersing agent and water to form a slurry. This slurry is processed in a blade-coating device to form green ceramic foils having a thickness of 20 μm.

The green foil is cut into card-shaped foils, printed with a nickel paste in accordance with the pattern of the internal electrodes, stacked, compressed and subdivided into individual capacitors. The capacitors are sintered at a temperature of 1300° C. The heating rate is 300° C./h up to 1000° C. and 50° C./h up to 1300° C. In the course of the sintering process, a gas mixture consisting of 99% of $N_2$ and 1% of $H_2$, saturated with water vapor, is passed through the furnace. Subsequently, cooling takes place at a rate of 300° C./h. After sintering, the capacitors are tempered in a tempering furnace at a temperature of 1000° C. In the course of the tempering process, a gas mixture consisting of nitrogen with 50–100 ppm of oxygen is passed through the furnace.

For the external electrodes use is made of a 6 nm thick CrNi-layer which is provided by vapor deposition and to which a 0.15 μm thick Au coating is applied.

Test results: ∈=14 3000; tan δ<5%, τ>220 h.

EXAMPLE 4

To manufacture a multilayer capacitor comprising a ceramic dielectric material of the composition $(Ba_{0.96}Ca_{0.04})_{1.01}[Ti_{0.815}Zr_{0.18}Mn_{0.005}]O_3$ with tungsten and zinc in a quantity of 0.0025 mol/formula unit each, and 0.125% by weight of $SiO_2$ as a sintering aid, 191.35 g of $BaCO_3$ ($d_{50}$=1.1 µm, BET:2.1 m$^2$/g), 1.04 g of $CaCO_3$ ($d_{50}$=0.8 µm), 65.12 g of $TiO_2$ ($d_{50}$=0.48 µm, BET:7 m$^2$/g), 22.18 g of $ZrO_2$ ($d_{50}$=0.12 µm, BET:21.9 m$^2$/g), 0.57 g of $MnCO_3$, 0.58 g of $WO_3$ ($d_{50}$=0.15 µm), 0.20 g of ZnO and 0.36 g of $SiO_2$ (colloidal, 22 nm) are ground in a planetary ball mill for two hours and mixed. For the grinding liquid use is made of cyclohexane, and for the grinding balls use is made of agate. Subsequently, the mixture is ground by means of 2 mm-YTZ-balls in isopropanol for 24 hours.

After grinding in the planetary ball mill, the mixture is dried in air under a surface evaporator and, subsequently, calcined at 1250° C. for 6 hours. The powdered material is mixed with polyvinyl alcohol as the binder, with a surface-active agent, a dispersing agent and water to form a slurry. This slurry is processed in a blade-coating device to form green ceramic foils having a thickness of 20 µm.

The green foil is cut into card-shaped foils, printed with a nickel paste in accordance with the pattern of the internal electrodes, stacked, compressed and subdivided into individual capacitors. The capacitors are sintered at a temperature of 1300° C. The heating rate is 300° C./h up to 1000° C. and 50° C./h up to 1300° C. In the course of the sintering process, a gas mixture consisting of 99% of $N_2$ and 1% of $H_2$, saturated with water vapor, is passed through the furnace. Subsequently, cooling takes place at a rate of 300° C./h. After sintering, the capacitors are tempered in a tempering furnace at a temperature of 1000° C. In the course of the tempering process, a gas mixture consisting of nitrogen with 50–100 ppm of oxygen is passed through the furnace.

For the external electrodes use is made of a 6 nm thick CrNi-layer which is provided by vapor deposition and to which a 0.15 µm thick Au coating is applied.

Test results: ∈=13 600; tan δ<5%, τ>150 h.

EXAMPLE 5

To manufacture a multilayer capacitor comprising a ceramic dielectric material of the composition $(Ba_{0.96}Ca_{0.04})_{1.01}[Ti_{0.8175}Zr_{0.18M n0.0025}]O_3$ with tungsten in a quantity of 0.0025 mol/formula unit, nickel in a quantity of 0.0025 mol/formula unit and 0.25% by weight of $SiO_2$ as a sintering aid, 191.35 g of $BaCO_3$ ($d_{50}$=1.1 µm, BET:2.1 m$^2$/g), 1.04 g of $CaCO_3$ ($d_{50}$=0.8 µm), 65.32 g of $TiO_2$ ($d_{50}$=0.48 µm, BET:7 m$^2$/g), 22.18 g of $ZrO_2$ ($d_{50}$=0.12 µm, BET:21.9 m$^2$/g), 0.29 g of $MnCO_3$, 0.58 g of $WO_3$ ($d_{50}$=0.15 µm), 0.37 g of NiO and 0.71 g of $SiO_2$ (colloidal, 22 nm) are ground in a planetary ball mill for two hours and mixed. For the grinding liquid use is made of cyclohexane, and for the grinding balls use is made of agate. Subsequently, the mixture is ground by means of 2 mm-YTZ-balls in isopropanol for 24 hours.

After grinding in the planetary ball mill, the mixture is dried in air under a surface evaporator and, subsequently, calcined at 1250° C. for 6 hours. The powdered material is mixed with polyvinyl alcohol as the binder, with a surface-active agent, a dispersing agent and water to form a suspension. This suspension is processed in a blade-coating device to form green ceramic foils having a thickness of 20 µm.

The green foil is cut into card-shaped foils, printed with a nickel paste in accordance with the pattern of the internal electrodes, stacked, compressed and subdivided into individual capacitors. The capacitors are sintered at a temperature of 1300° C. The heating rate is 300° C./h up to 1000° C. and 50° C./h up to 1300° C. In the course of the sintering process, a gas mixture consisting of 99% of $N_2$ and 1% of $H_2$, saturated with water vapor, is passed through the furnace. Subsequently, cooling takes place at a rate of 300° C./h. After sintering, the capacitors are tempered in a tempering furnace at a temperature of 1000° C. In the course of the tempering process, a gas mixture consisting of nitrogen with 10–50 ppm of oxygen is passed through the furnace.

For the external electrodes use is made of a 6 nm thick CrNi-layer which is provided by vapor deposition and to which a 0.15 µm thick Au coating is applied.

Test results: ∈=15 800; tan δ<5%, τ>250 h.

EXAMPLE 6

To manufacture a multilayer capacitor comprising a ceramic dielectric material of the composition $(Ba_{0.96}Ca_{0.04})_{1.01}[Ti_{0.8175}Zr_{0.18}Mn_{0.0025}]O_3$ with tungsten in a quantity of 0.0025 mol/formula unit, ytterbium in a quantity of 0.005 mol/formula unit and 0.25% by weight of $SiO_2$ as a sintering aid, 191.35 g of $BaCO_3$ ($d_{50}$=1.1 µm, BET:2.1 m$^2$/g), 1.04 g of $CaCO_3$ ($d_{50}$=0.8 µm), 65.32 g of $TiO_2$ ($d_{50}$=0.48 µm, BET:7 m$^2$/g), 22.18 g of $ZrO_2$ ($d_{50}$=0.12 µm, BET:21.9 m$^2$/g), 0.29 g of $MnCO_3$, 0.58 g of $WO_3$ ($d_{50}$=0.15 µm), 1.97 g of $y_2O_3$ and 0.71 g of $SiO_2$ (colloidal, 22 nm) are ground in a planetary ball mill for two hours and mixed. For the grinding liquid use is made of cyclohexane, and for the grinding balls use is made of agate. Subsequently, the mixture is ground by means of 2 mm-YTZ-balls in isopropanol for 24 hours.

After grinding in the planetary ball mill, the mixture is dried in air under a surface evaporator and, subsequently, calcined at 1250° C. for 6 hours. The powdered material is mixed with polyvinyl alcohol as the binder, with a surface-active agent, a dispersing agent and water to form a suspension. This suspension is processed in a blade-coating device to form green ceramic foils having a thickness of 20 µm.

The green foil is cut into card-shaped foils, printed with a nickel paste in accordance with the pattern of the internal electrodes, stacked, compressed and subdivided into individual capacitors. The capacitors are sintered at a temperature of 1300° C. The heating rate is 300° C./h up to 1000° C. and 50° C./h up to 1300° C. In the course of the sintering process, a gas mixture consisting of 99% of $N_2$ and 1% of $H_2$, saturated with water vapor, is passed through the furnace. Subsequently, cooling takes place at a rate of 300° C./h. After sintering, the capacitors are tempered in a tempering furnace at a temperature of 1000° C. In the course of the tempering process, a gas mixture consisting of nitrogen with 10–50 ppm of oxygen is passed through the furnace.

For the external electrodes use is made of a 6 nm thick CrNi-layer which is provided by vapor deposition and to which a 0.15 µm thick Au coating is applied.

Test results: ∈=17 000 tan δ<5%, τ>160 h.

We claim:

1. A capacitor, comprising a ceramic dielectric material and at least two electrodes, said dielectric material essentially consisting of a dielectric composition with a doped barium-calcium-zirconium-titanate, characterized in that said doped barium-calcium-zirconium-titanate has the composition $$(Ba_{0.96}Ca_{0.04})_a[Ti_{0.82-y}Zr_{0.18}Mn_y]O_3,$$

wherein $0.001 \leq y \leq 0.01$, $1.00 < a \leq 1.02$ and being doped with tungsten in a quantity r of 0.001 to 0.005 mol/formula unit and with at least one element of the group formed by aluminum, gallium, yttrium, zinc, nickel and ytterbium in a quantity s of 0.001 to 0.005 mol/formula unit.

2. A capacitor as claimed in claim 1, characterized in that nickel or a nickel alloy is used as the material for the electrodes.

3. A capacitor as claimed in claim 1, characterized in that the capacitor is a multilayer capacitor comprising internal electrodes of nickel or a nickel alloy.

4. A capacitor as claimed in claim 1, characterized in that $y \leq 0.005$ and the atomic ratio n of (y+S) is smaller than 1.

5. A capacitor as claimed in claim 1, characterized in that the dielectric ceramic composition comprises 0.1–1% by weight of a sintering aid composed of 0.16 to 0.29 mol of lithium oxide, 0.004 to 0.39 mol of one of the oxides CaO, MgO, BaO or SrO as well as silicon oxide.

6. A capacitor, comprising a ceramic dielectric material and at least two electrodes, said dielectric material consisting essentially of a dielectric composition with a doped barium-calcium-zirconium titanate, characterized in that said doped barium-calcium-zirconium titanate has the composition:

$$(Ba_{0.96}Ca_{0.04})_a[Ti_{0.82-y}ZR_{0.18}Mn_y]O_3,$$

wherein $y \leq 0.005$, $1 > a = 1.01$ mol/formula unit and being doped with tungsten in a quantity $r = 0.0025$ mol/formula unit and with at least one element selected from the group consisting of aluminum, gallium, yttrium, zinc, nickel and ytterbium in a quantity $s > 0.010$ mol/formula unit.

* * * * *